April 28, 1970 L. G. CLAWSON 3,508,530
INTERNAL COMBUSTION ENGINE
Filed May 23, 1968 6 Sheets-Sheet 1

INVENTOR.
LAWRENCE G. CLAWSON
BY
ATTORNEYS

April 28, 1970 L. G. CLAWSON 3,508,530
INTERNAL COMBUSTION ENGINE
Filed May 23, 1968 6 Sheets-Sheet 2

INVENTOR.
LAWRENCE G. CLAWSON
BY
Blair Buckles Cesari + St.Onge
ATTORNEYS

April 28, 1970     L. G. CLAWSON     3,508,530
INTERNAL COMBUSTION ENGINE Filed May 23, 1968     6 Sheets-Sheet 3

INVENTOR.
LAWRENCE G. CLAWSON
BY
*Blair Buckles Cesari & St. Onge*
ATTORNEYS

April 28, 1970  L. G. CLAWSON  3,508,530
INTERNAL COMBUSTION ENGINE
Filed May 23, 1968  6 Sheets-Sheet 4

FIG.11

INVENTOR.
LAWRENCE G. CLAWSON
BY
Blair Buckles Cesari + St. Onge
ATTORNEYS

April 28, 1970  L. G. CLAWSON  3,508,530
INTERNAL COMBUSTION ENGINE
Filed May 23, 1968  6 Sheets-Sheet 5

INVENTOR.
LAWRENCE G. CLAWSON
BY
Blair Buckles Cesari & St.Onge

ATTORNEYS 3,508,530
INTERNAL COMBUSTION ENGINE
Lawrence G. Clawson, Dover, Mass., assignor to Dynatech Corporation, Cambridge, Mass.
Continuation-in-part of applications Ser. No. 557,665, June 15, 1966, Ser. No. 607,337, Dec. 2, 1966, and Ser. No. 645,203, June 12, 1967. This application May 23, 1968, Ser. No. 776,285
Int. Cl. F02b 23/10, 53/02, 1/08
U.S. Cl. 123—191                                                 21 Claims

ABSTRACT OF THE DISCLOSURE

An internal combustion engine in which a fuel-air charge in a main combustion chamber is ignited, without detonation, by exposure to a hot gas jet from a spark-ignited prechamber can operate efficiently with a variety of hydrocarbon fuels. The gas jet traverses the main chamber before the main chamber charge can detonate and is sufficiently hot to ignite a main chamber charge too lean for normal spark ignition and for flame propagation. Preferably, the engine has an improved fuel injection system having separate fuel lines for injecting fuel directly into each prechamber. A valve in each line opens in response to a reduced pressure in a associated prechamber only during a selected portion of the engine operating cycle so that a predetermined volume of fuel is injected into the prechamber to form the jet.

---

This application is a continuation-in-part of Ser. No. 557,665, filed June 15, 1966, Ser. No. 607,337, filed Dec. 2, 1966, and Ser. No. 645,203 filed June 12 1967, all now abandoned.

BACKGROUND OF THE INVENTION

This invention relates to an improved internal combustion engine. It relates especially to an engine of the preignition type in which the combustion chamber for each cylinder comprises a prechamber communicating through a fluid passage with a main chamber. In operation, the fuel charge in the prechamber is ignited producing hot gases which jet into the main chamber and ignite the main fuel charge therein.

These preignition type engines are already well known. For example, U.S. Patent 2,758,576 and the Society of Automotive Engineers Journal, November 1963, pp. 60–64, describe a preignition engine of the reciprocating variety; British Patent 995,101 describes a rotary piston engine which also operates on the preignition principle.

Conventional preignition engines have not been widely accepted for several reasons. First, they have limited output power and they are not very efficient. Consequently, their fuel consumptions are relatively high and their power-to-weight ratios are relatively low. Secondly, these engines do not run smoothly over the full range of required speeds from idling speed to full throttle. This creates a noise problem and also spoils engine performance. These difficulties stem mainly from the current designs of the chambers in each cylinder and the passage between them. That is, in conventional dual chamber engines, the existing relationships between these elements are not conducive to maximum engine performance. Also, the ordinary fuel injection systems do not provide optimum performances of these engines.

SUMMARY OF THE INVENTION

The present invention provides a dual chamber engine in which an ignited fuel charge in the prechamber produces a jet of hot gas that propagates across the main chamber. An engine embodying the invention has a prechamber of roughly spherical shape and a main chamber that has a relatively thin elongated shape. The passage between the chambers is tangential to the prechamber and is directed along the longitudinal dimension of the main chamber.

A fuel injection system to be described in detail later delivers a combustible fuel charge to the prechamber. The main chamber also receives a variable fuel qauntity yielding fuel-air ratios from zero up to approximately 140% of stoichiometric. A spark plug or like ignition source ignites the prechamber charge. The two chambers and the interconnecting passage are so arranged that the ignited prechamber charge produces a jet of hot gas which escapes through the passage at or close to sonic velocity into the main chamber. The hot jet travels substantially the entire length of the main chamber and ignites the fuel charge therein, regardless of the latter's ability to support flame front propagation, i.e. in spite of low fuel-to-air ratio of the main chamber charge.

Further, the jet travels through the main chamber at a velocity sufficient to ignite the end charge therein before the end charge detonates. The end charge is defined as the portion of the charge in the main chamber furthest from the ignition source. It is the detonation of this end charge which is responsible for engine "knock."

A general object of the invention is to provide an improved internal combustion engine. Particular objectives are to improve efficiency and fuel economy and thereby decrease engine operating cost. A further particular object is to provide an engine which is characterized by multi-fuel operation, that is, which can operate with a wide range of hydrocarbon fuels.

A specific object of the invention is to provide an engine which operates with a part load fuel-to-air ratio less than the stoichiometric proportions. Such an engine burns with the result that the exhaust has a minimal level of air pollutants. Also, such an engine has high fuel economy.

Another object of the invention is to provide an internal combustion engine that can compress the fuel charge close to its autoignition compression ratio and yet is free of detonation.

A further object of the invention is to provide an improved two-chamber internal combustion engine in which an ignited fuel charge in a prechamber ignites a main chamber charge that is too lean for spark or like external ignition.

Another object of the invention is to provide an efficient fuel injection system for an internal combustion engine especially of the preignition type.

A corollary object is to reduce the cost of fuel injection control systems for these engines.

A further object is to provide a fuel injection system which delivers a controlled amount of fuel to these engines so that there is very little variation in the prechamber charge over a wide range of engine speeds.

Another particular object of the invention is to increase the reliability of fuel injection systems by reducing the number of moving parts required for fuel distribution and injection timing.

A further object of the invention is to provide a fuel injection system which can handle a variety of different fuels.

Another object is to provide a fuel injection engine exhibiting superior performance over a wide range of conditions.

Another object is a method of injecting fuel into an internal combustion engine providing one or more of the above stated advantages.

Other objects of the invention will in part be obvious and will in part appear hereinafter.

The invention accordingly comprises the several steps and the relation of one or more of such steps with respect to each of the others, and the apparatus embodying features of construction, combination of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENTS

Figure 1:
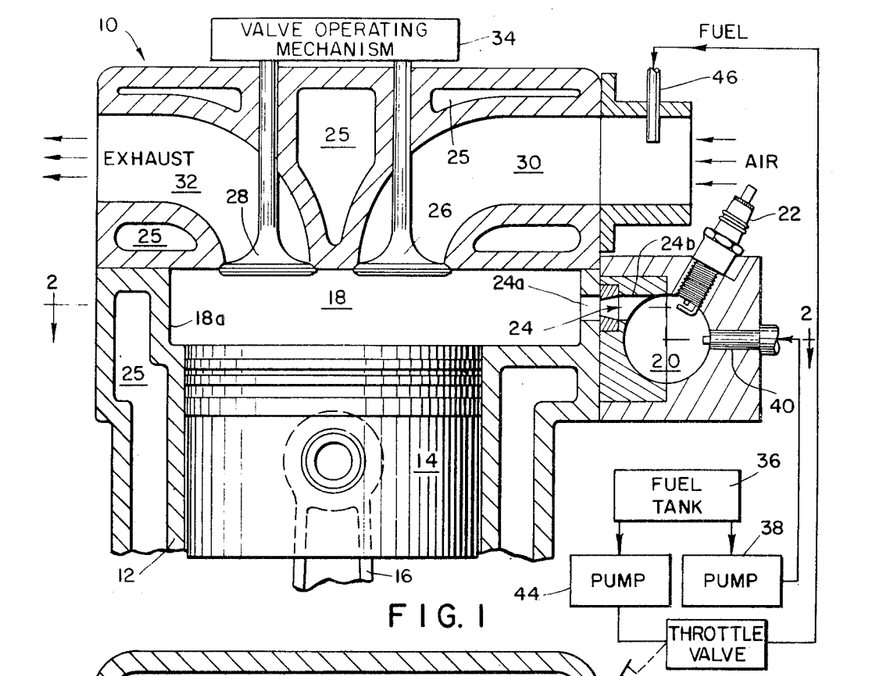
FIG. 1 is a fragmentary side cross section of a single cylinder internal combustion Otto cycle engine embodying the invention.
Figure 2:
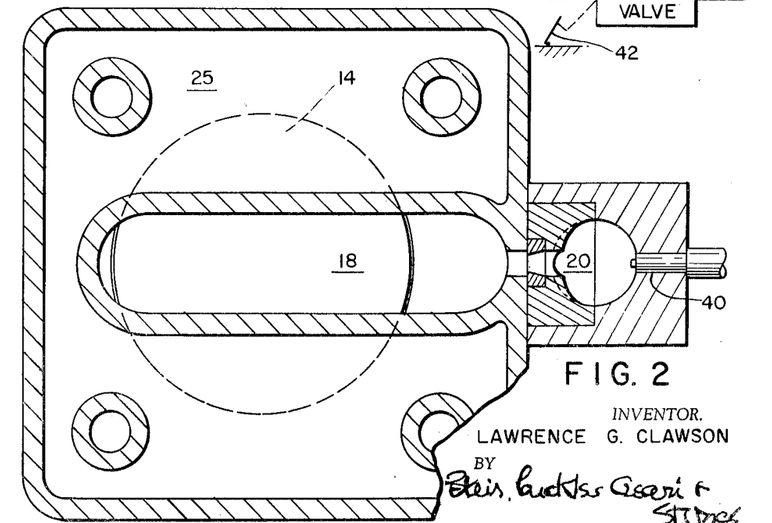
FIG. 2 is a plan view showing the arrangement of the two chambers in the engine of FIG. 1 as seen in section 2—2 of that figure.

FIGS. 1 and 2 illustrate the principles of the invention as applied to a single cylinder Otto cycle engine 10 having the displacement of a medium size spark ignition engine. Engine 10 has a water-cooled cylinder wall 12 that houses a reciprocating piston 14 joined to a connected rod 16. The combustion chamber volume of the engine 10 when the piston 14 is at top dead center, the position illustrated in FIG. 1, is termed the compressed volume. This minimal volume comprises an elongated main chamber 18 at the top (FIG. 1) of the cylinder to be described in detail later and a small prechamber 20. A passage 24 communicates between one end of the main chamber via an opening 24a in its side wall and the prechamber.

An air intake valve 26 controls the passage of fuel and air from an intake port 30 to the main chamber 18; the intake port 30 preferably receives unthrottled air, as in a diesel engine, to attain efficient fuel combustion. Similarly, an exhaust valve 28 controls the passage of exhaust products from the main chamber to an exhaust port 32. The valves 26 and 28 are operated by a conventional valve operating mechanism 34.

The prechamber 20, which has no valves, receives air through the passage 24 from the main chamber 18 during the compression stroke of the engine. Combustion residuals are drawn from the prechamber through the passage by blowdown during the exhaust stroke of the piston. As also shown in FIG. 1, the prechamber is fitted with a spark plug 22.

Further, cooling passages 25, shown in FIGS. 1 and 2, conduct a coolant throughout the engine 10 in a conventional manner to cool the main chamber 18 and the cylinder wall 12. Prechamber cooling can be accomplished by air convection as shown or by water jacketing; however, the heat transfer should be held relatively low to maintain high prechamber wall temperatures.

The engine illustrated in FIG. 1 employs a conventional fuel system consisting of a fuel tank 36 supplying a pump 38 that delivers a charge of fuel to the prechamber 20 through a fuel nozzle 40. A throttle valve 42 applies fuel from another pump 44 to the intake port 30 through a nozzle 46. The throttle valve 42 is preferably closed when the engine is idling so that fuel is delivered to the intake port only when the engine is under load.

During four-cycle operation of the engine 10, when the piston 14 moves down (FIG. 1) in the intake stroke, air with the desired amount of fuel is drawn from the intake port 30 into the main chamber 18 and the piston-swept volume below it. The fuel system preferably delivers an amount of fuel to the intake port to provide a fuel-to-air ratio that ranges from 0% to approximately 140% of the stoichiometric proportion, according to the engine load.

Also during the intake stroke or early in the compression stroke, the pump 38 delivers a small metered quantity of fuel into the prechamber 20 through the nozzle 40. The amount of fuel thus directed into the prechamber 20 is sufficient to maintain a combustible mixture therein; that is, a fuel-to-air charge that will ignite upon exposure to a spark from the plug 22 and produce a flame that will propagate through the prechamber.

During the compression stroke, a small fraction of the air charge, along with its fuel content, is forced through the passage 24 from the main chamber 18 into the prechamber 20. The design of the prechamber 20 and of the passage 24, described below, is such that the air forced into the prechamber 20 has a swirling turbulent motion that mixes the metered prechamber fuel with the air and main chamber fuel to yield a substantially homogeneous mixture. Further, the swirling air motion vaporizes most, if not all, of the prechamber fuel charge; the hot residual vapors left in the prechamber from previous cycles enhance the vaporization. Preferably, the total amount of fuel introduced into each prechamber during each cycle should remain substantially constant over all engine speeds. A preferred injection system for accomplishing this will be described later in connection with FIG. 11.

As the piston 14 approaches its uppermost position at the end of the compression stroke, the spark plug 22 is activated in the conventional manner and ignites the prechamber charge.

Due to the design of the prechamber 20 and the passage 24, to be described in detail later, the prechamber charge burns under an approximately constant volume condition and generates a peak pressure in the prechamber of at least two times the maximum compression pressure in the main chamber. Further, the temperature in the prechamber during combustion exceeds 2000° Rankine. In fact, with a petroleum fuel, it is on the order of 5000° Rankine.

These conditions in the prechamber produce a jet of hot burned gas that travels through passage 24 at approximately choked sonic conditions, e.g. 3500 ft./sec. This is approximately ten times the flame front propagation speed in a typical engine. This fluid ignition source penetrates substantially the entire length of the main chamber 18 to its far end 18a in an extremely short time. Accordingly, it constitutes, in essence, an instantaneous ignition source extending the entire length of the main chamber. Since the hot jet essentially reaches the far end of the main chamber and since the distances between the hot jet and the top, bottom and side walls 18b, 18c and 18d of main chamber 18 are relatively small, the jet is able to ignite the fuel charge in the main chamber even though the latter is too lean to support flame front propagation, e.g. it may have a fuel-air ratio which is 0%.

Furthermore, the hot jet travels to chamber end 18a at a speed sufficient to ignite any end charge in chamber 18 before that end charge detonates due to the buildup of pressure in chamber 18 following the delay time in the pressure profile in the chamber. Actually, the velocity of the jet in chamber 18 is on the order of five times the speed at which the flame front in a conventional combustion engine propagates across the combustion chamber. The ability of the jet to ignite the end charge before that can detonate minimizes engine "knock" even when the engine is operating at full power with a rich fuel-air mixture in chamber 18.

When the main chamber charge ignites, the resulting combustion products act on the piston 14 during the power stroke. As the piston 14 is subsequently driven upward during the exhaust stroke, the combustion products from prechamber 20, as well as from main chamber 18, exit through the exhaust valve 28 to the exhaust port 32. This completes the four-cycle sequence.

Because the hot jet from prechamber 20 ignites whatever fuel is in the main chamber charge substantially regardless of the fuel-to-air ratio, the main chamber can have such a lean charge that essentially all the fuel is burned and none is discharged to the air in the exhaust. In fact, when the engine is idling, it is preferable that no fuel be supplied to the main chamber and that the prechamber charge be sufficient to just overcome friction and other losses in the engine in order to keep it running. Under this condition, there is more than ample air in main chamber 18 to essentially completely oxidize all the fuel delivered to the prechamber so that the engine truly burns clean. Fuel is supplied to the main chamber only in an amount sufficient to meet the load demands on the engine. For most loads, the total fuel-to-air ratio in both chambers is less than stoichiometric proportions so that the engine continues to run clean and delivers a minimum of unburnt hydrocarbons to the atmosphere.

Under a heavy load, the main chamber requires fuel in excess of the stoichiometric proportions. It may call for as much as 140% of the stoichiometric value. Under this heavy load condition, some unburnt or partially oxidized fuel is present in the exhaust from the engine, but it is considerably less than in present-day motor vehicles and is in a sufficiently small amount so that it can be fairly economically oxidized with exhaust treatment devices.

Thus, a distinct advantage of the present engine is that it consumes an essentially minimum amount of fuel and introduces a minimum of hydrocarbons to the atmosphere.

Further, the engine can operate with compression ratios considerably higher than those now commonly used and hence achieve high efficiency, resulting in still greater economy. The reason for this is that the main chamber charge is generally too lean to be combustible, i.e. to be ignited by a spark, and hence can be compressed considerably more than the fuel charges for conventional internal combustion engines without detonating. In addition, the speed with which the hot igniting jet acts on the main chamber charge enables the engine to operate with fuels having essentially any octane rating and any burning rate.

Two-cycle operation of the engine 10 is essentially the same as that described above. Fuel is delivered to the prechamber 20, and air and fuel are fed to the main chamber 18. When the piston approaches top dead center, the prechamber charge is ignited causing hot gases to jet into the main chamber. The jet ignites the main chamber charge regardless of the leanness of that charge and also ignites any end charge present in the main chamber. The expanding gases in the main chamber drive the piston down, whereupon the gases exhaust from the chamber, completing the cycle.

The specific arrangement of the engine 10 to achieve these results in accordance with the invention will now be described with further reference to FIGS. 1 and 2.

The amount of fuel in the prechamber 20 just prior to ignition should yield a fuel-to-air ratio that can be ignited with the spark plug 22. For a petroleum base fuel, the prechamber fuel-to-air ratio is suitably between 0.04 and 0.16 gram of fuel per gram of air. In an experimental single-cylinder engine similar to the illustrated one, optimal operation was achieved with a fuel-to-air weight ratio of approximately 0.075.

The volume of the prechamber is preferably large enough to burn an amount of fuel sufficient to keep the engine running under no load conditions at a reasonable idling speed. The prechamber volume also should be large enough to handle the charge necessary to ignite the fuel charge in the main chamber in the manner described above. An engine having a prechamber volume of one-eighth to one-twelfth of the main chamber volume has proven satisfactory. If it is larger than this range, the engine idles at an excessive speed. If it is smaller, the prechamber charge is insufficient to operate the engine under no-load conditions.

Further, the prechamber should have a minimum surface-to-volume ratio. Such a shape minimizes the distance the flame front must travel, thereby minimizing the burning time required for the prechamber charge. Hence, a substantially spherical prechamber is preferred. In any event, the prechamber preferably has a substantially circular cross section in the plane through the passage 24, i.e. in the plane shown in FIG. 1, and is arranged with this circular cross section tangential to the passage 24. That is, one edge 24b of the passage is tangential to the circular periphery of the prechamber. With this tangential design, the swirling, mixing motion discussed above is imparted to the air forced into the prechamber from the main chamber during the compression stroke of the engine.

Further, to facilitate attainment of a high temperature in the prechamber, it preferably has walls of a material that has a relatively low thermal conductivity. A suitable material for this purpose is cast iron or steel.

As also shown in FIGS. 1 and 2, the passage 24 interconnecting the chambers 18 and 20 preferably has a relatively regular transverse cross section and, contrary to all prior teaching, is as short as practical. Also, the passage is aligned with the long dimension of chamber 18. Passage 24 may be converging from the prechamber 20 to the main chamber 18, or converging-diverging. In particular, the square root of the cross sectional area of the passage is preferably between approximately 0.13 and 0.24 times the cube root of the volume of the prechamber 20. This means that the diameter of a circular passage 24 should be about 0.15 to 0.25 times that root.

The reason for this requirement on the cross section of the passage 24 is to create an approximately constant volume burning condition in the prechamber 20 with a sustained peak pressure during burning of at least two times the compression pressure in the main chamber. With these conditions, the hot burned gas in the prechamber will pass the minimum orifice of the passage 24 at approximately choked sonic conditions and sufficient air can enter the prechamber during each compression stroke to form a combustible mixture with the fuel charge therein. Unless this requirement is met, poor burning occurs which degrades engine performance, no matter what the other engine parameters are.

The walls of the passage 24 should be formed or coated with an insulating material that is relatively hard and heat resistant to minimize erosion by the hot gas. Further, this material forming the passage 24 preferably has a high specific heat and low thermal conductivity. This enables it to preheat the air-fuel mixture forced into the prechamber from the main chamber 18 during the compression stroke and thereby increase the rate at which the fuel in the prechamber is vaporzied. Zirconia or alumina is a suitable material.

Turning now to the main chamber 18, it is dimensioned to minimize the distances between the chamber top, bottom and side walls 18b, 18c and 18d, respectively, and the path of the jet or hot gas all along the chamber. The reason for this is to expose the high temperature of the igniting jet directly to almost all the fuel-air mixture in chamber 18. This means that the engine does not have to rely at all on flame front propagation to ignite the main chamber fuel mixture. Accordingly, fast, even combustion occurs regardless of the fuel-air ratio of the mixture.

The length of main chamber 18 is large compared to its height and width in order to provide the requisite chamber volume to contain the proper main fuel charge. Actually, the length is substantially equal to the distance reached by the hot jet by the time the prechamber pressure has dropped to the pressure in the main chamber. This insures that the jet ignites any end gas at the chamber end 18a before the rise in temperature and pressure in chamber 18 cause the end gas to detonate, resulting in engine "knock." To satisfy the above constraints and for best engine performance, the ratio of the length of the main chamber to the square root of its cross sectional area should be between two and five.

In contrast to the prechamber 20, the main chamber 18 is designed to be relatively cool. Thus, the walls of the engine block defining the main chamber 18 are relatively thin and water passages 25 are disposed in relatively high thermal communication with the main chamber. The arrangement of the valves in the main chamber is not critical.

Figure 3:
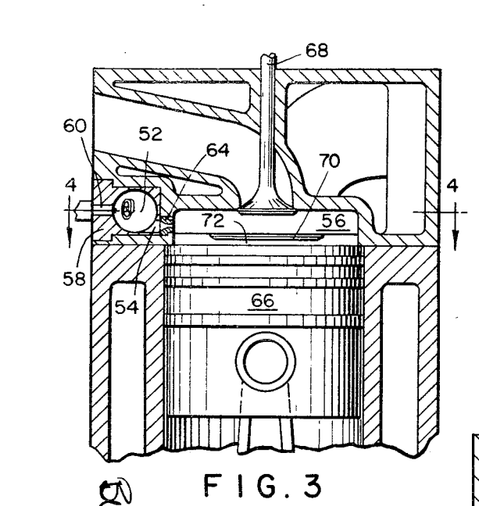
FIGS. 3, 4 and 5 are, respectively, end, plan and side cross sectional views of a multiple-cylinder Otto cycle engine constructed in accordance with the invention.
Figure 4:
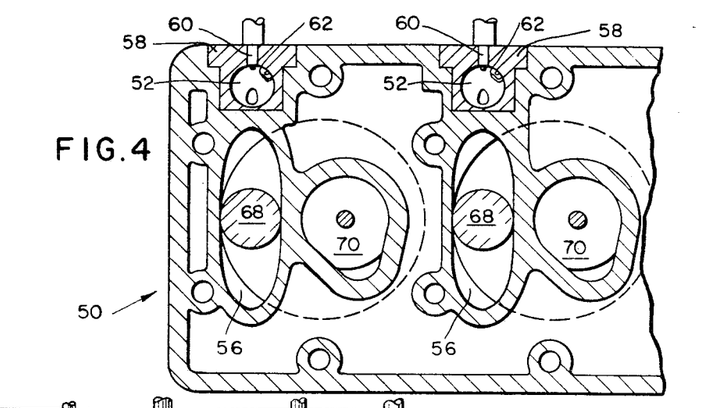
Figure 5:
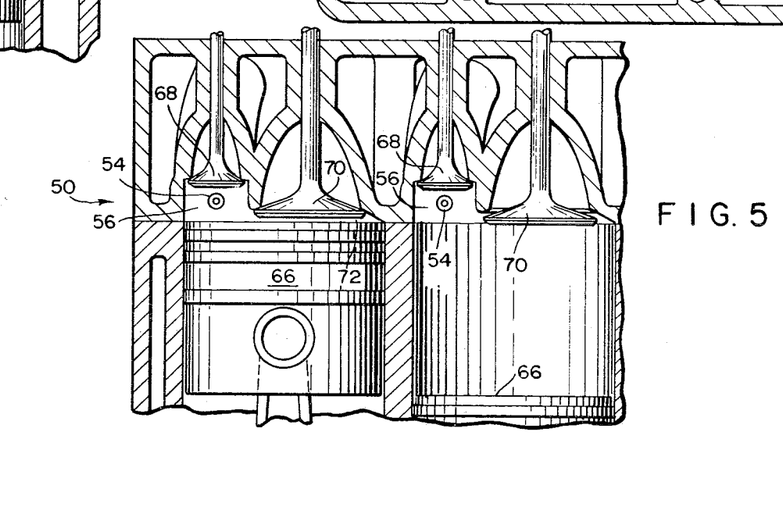

FIGS. 3, 4 and 5 illustrate the application of the foregoing design to a multi-cylinder internal combustion engine 50. Each cylinder of the engine has a combustion chamber comprising a spherical prechamber 52 connected through a single fluid passage 54 to a main chamber 56.

A separate prechamber block 58 secured in the engine "head," which can be a machined casting, forms the prechamber. The block 58 is preferably of a material capable of withstanding high temperatures and having a relatively low thermal conductivity. The prechamber block is fitted with a prechamber fuel nozzle 60 and with a spark plug 62.

As shown in FIG. 3, a neck fitting 64, having a tapered bore and of a material that is resistant to high temperatures and abrasion, forms the end of the passage 54 at the main chamber 56. As in the single cylinder engine 10 of FIGS. 1 and 2, the passage 54 is tangential to the wall of the prechamber 52.

The width and height of the main chamber 56 are small relative to the length, in accordance with the foregoing discussion regarding the main chamber of the single cylinder engine 10. Also, the main chamber is oriented with its long dimension in line with passage 54. With this arrangement, the illustrated main chamber 56 has a length approximately equal to the diameter of the engine piston 66 and the main chamber width overlies roughly one-third of the diameter of the piston 66.

The intake valve 68 for each cylinder of the engine 50 enters the main chamber 56 of the combustion chamber. The exhaust valve 70 enters the combustion chamber at a flat region 72 (shown in FIGS. 3 and 5) overlying the piston next to the main chamber. Of course, with a two-cycle engine, there are no such valves because the pistons themselves perform the functions of the valves.

Figure 6:
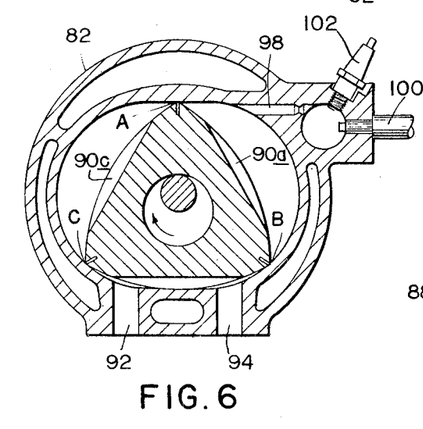
FIG. 6 is a fragmentary side cross section of a Wankel engine embodying the invention.
Figure 7:
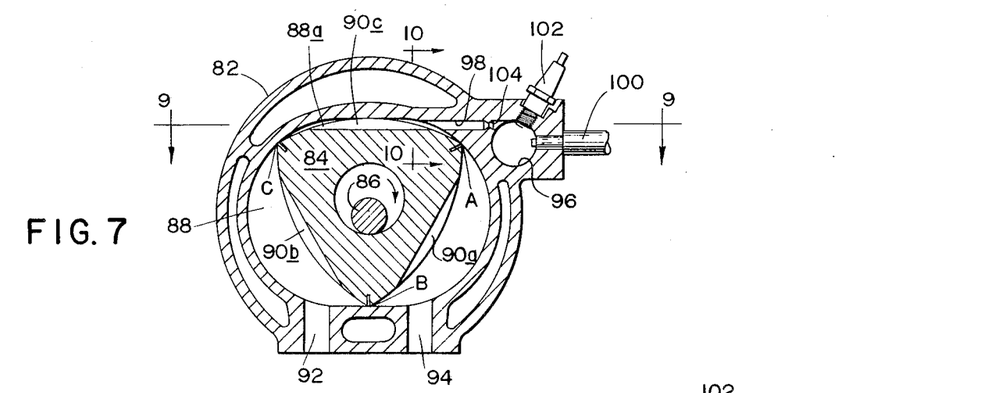
FIGS. 7 and 8 are similar views of the FIG. 6 engine at different positions in the operating cycle.
Figure 8:
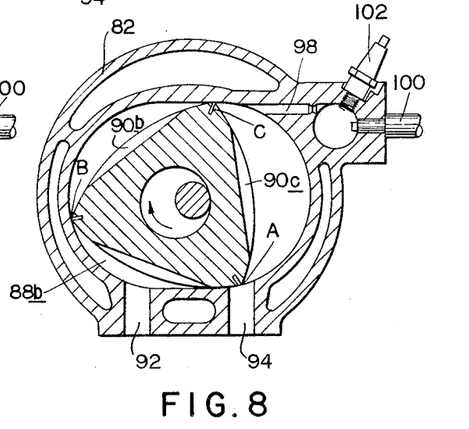

Referring now to FIGS. 6–8, this invention lends itself particularly well to the so-called Wankel internal combustion engine. The reason for this is that when the rotary piston of the Wankel engine is at "top dead center," the compressed volume of the combustion chamber is elongated and dimensioned generally to fit the needs of the invention. The operating details of the Wankel rotating combustion engine are well known and will not be repeated here. For example, the engine is described in the publication entitled The NSU-Wankel Rotating Combustion Engine by Dr. Walter G. Froede, NSU Motorenwerk, Neckarsulm, Germany, published January 1961 by the Society of Automotive Engineers, Inc.

Figure 9:
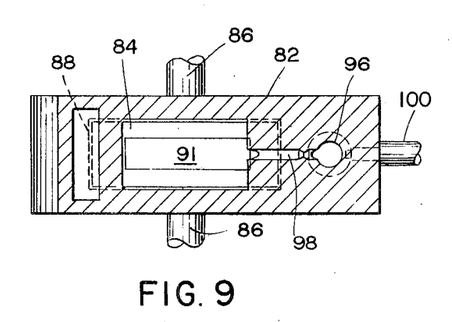
FIG. 9 is a sectional view along line 9—9 in FIG. 7.

FIGS. 6–8 illustrate a single cylinder Wankel rotary combustion engine 80 at different moments in its operating cycle. Engine 80 has a water-cooled cylinder wall 82 housing a rotary piston 84 which turns a drive shaft 86. Cylinder wall 82 defines the usual lobed epitrochoidal combustion chamber 88. Piston 84 is generally triangular and rotates clockwise within chamber 88. As it rotates, its axis of rotation shifts along a circular locus so that its three corners A, B and C always form a seal with cylinder wall 82. Also, three sides 90a, 90b and 90c of piston 84 are hollowed out, forming three elongated troughs 91 (FIG. 9).

Chamber 88 has the usual intake port 92 and exhaust port 94. Unlike the reciprocating piston engine, no valves are required to control these ports since piston 84 performs this function.

A prechamber 96 is built into cylinder wall 82. Chamber 96 communicates with the main combustion chamber 88 by wall of a passage 98. A rich fuel mixture is supplied to chamber 96 by means of a nozzle 100. Also, chamber 96 is fitted with a spark plug 102.

As seen from FIGS. 6–8, prechamber 96 is arranged at the end of main chamber 88 nearer exhaust port 94. Also, the prechamber is located near the top of chamber 88, i.e. opposite the ports 92 and 94 so that passage 98 opens into chamber 88 near the top thereof with its axis aligned with the long dimension of chamber 88. Passage 98 has a constriction 104 so that its cross sectional area bears the same relationship to the volume of prechamber 96 as described above in connection with FIGS. 1–5. That is, the minimum diameter of a circular passage 98 is between approximately .15 and .25 times the cube root of the prechamber volume.

Referring now to FIG. 6, assume that a lean fuel mixture has just been introduced into the portion of combustion chamber 88 adjacent piston side 90c by way of port 92. As the piston rotates in the clockwise direction indicated by the arrow, the geometry of the system is such that the enclosed volume 88a defined by cylinder wall 82 and piston side 90c becomes progressively smaller. This compresses the lean mixture in volume 88a so that when piston 84 reaches the top dead center position in FIG. 7, the mixture is in a highly compressed state.

During this compression part of the cycle, a rich fuel mixture is pumped into prechamber 96 through nozzle 100. Also, a small fraction of the air-fuel charge just introduced into volume 88a is forced through passage 98 into prechamber 96. The spherical shape of prechamber 96 and tangentially directed passage 98 combined to give the fuel-air mixture forced into prechamber 96 a swirling turbulent motion so that it completely mixes with and vaporizes the fuel already in the prechamber, forming a highly combustible mixture therein.

As piston 84 approaches "top dead center," spark plug 102 ignites the prechamber 96 charge which burns at a temperature in excess of 2000° Rankine. Due to the aforesaid size relationship between the prechamber 96 and passage 98, the prechamber charge burns under an approximately constant volume condition and generates a peak pressure which is at least two times the maximum compression pressure in the main chamber. These combustion conditions in the prechamber produce a jet of hot gas which escapes through passage 98 at approximately choked sonic conditions and enters chamber 88.

Figure 10:
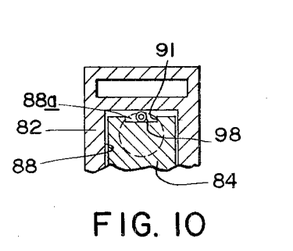
FIG. 10 is a sectional view along line 10—10 in FIG. 9.

Referring to FIGS. 9 and 10, when piston 84 is at "top dead center," the volume 88a is a minimum and constitutes the compressed volume of the combustion chamber. At this point, volume 88a is elongated in the direction in which the jet travels from passage 98. Also, its height and width are relatively small. Thus, the hot gas jet issuing from passage 98 is exposed to a large portion of the charge in volume 88a. It constitutes, then, a substantially instantaneous ignition source extending almost the entire length of volume 88a. Consequently, it is able to ignite the main charge despite its leanness. Thus, there need be no reliance at all on flame front propagation to ignite the fuel charge portions adjacent to the walls of the main chamber. Further, the igniting jet, traveling along volume 88a far faster than the speed of the flame front in a conventional engine, acts on any end charge in the chamber before the rise in pressure in the chamber causes it to detonate.

For optimum performance, the length of the volume 88a when fully compressed should be substantially equal to the distance reached by the hot gas jet by the time the prechamber 96 pressure has dropped to the pressure in volume 88a. For this, the ratio of the length of compressed volume 88a, i.e. the length of piston side 90c, to the square root of its cross sectional area should be between two and eight. In the Wankel engine, the upper limit of this ratio is somewhat higher than the similar ratio associated with the FIGS. 1–5 engines. This may be because the chamber in which combustion is confined during each cycle, i.e. volume 88a, is continuously moving in the direction opposite the direction of travel of the igniting jet from passage 98. This allows the jet in a rotary piston engine to progress further relative to the combustion chamber before the prechamber 96 pressure drops below the critical value noted above.

Upon ignition, the gases in volume 88a expand rapidly, thereby driving piston 84 in the clockwise direction indicated by the arrow.

As shown in FIG. 8, when piston corner A reaches exhaust port 94, the combustion products in volume 88a as well as those in prechamber 96 escape through port 94. The turbulence generated at this point in time scavenges prechamber 96 so that it is ready to receive its next charge of fuel.

At the same time, a lean fuel-air charge is pumped through inlet port 92 into volume 88b defined by cylinder wall 92 and piston side 90a. This charge is then compressed and ignited by a jet from passage 98 as described above.

Thus, as each side of piston 84 encounters inlet port 92, a lean fuel-air charge is introduced into the combustion chamber volume bounded thereby and a rich mixture is pumped into prechamber 96. As piston 84 rotates, the charge in the combustion chamber is compressed and then ignited by the hot jet from prechamber 96 to develop the power to rotate the piston. Then, as each side of the piston arrives at outlet port 94, the products of combustion in the volume bounded thereby and in prechamber 96 exhaust through port 94.

The placement of passage 98 in the combustion chamber wall 82 is important. More particularly, the passage should be positioned to direct the igniting jet lengthwise along the compressed volume when the piston is at "top dead center," i.e. volume 88a in FIG. 7. Also, however, the passage must communicate with the combustion chamber volume which is being vented through port 94 at any given time, i.e. volume 88a in FIG. 8. This is so that passage 98 and prechamber 96 will be scavenged properly during the exhaust portion of each operating cycle.

While we have specifically illustrated a Wankel engine employing a two lobe combustion chamber, the present invention is applicable to those having a three lobe chamber. Also, of course, it can be employed in multi-cylinder Wankel engines.

Because they often run unthrottled, preignition engines demand that a small precise charge of fuel be introduced into the prechamber during each engine cycle. Furthermore, the amount of combustible fuel in the prechamber must remain substantially constant over a wide range of engine speeds. Conventional injection systems are unable to consistently deliver the proper fuel charge to the prechamber both when the engine is idling and when it is at full throttle. This degrades engine performance.

Also, all of the known prior art fuel injection systems require rather complex distributing and timing mechanisms to control injection of fuel in the desired quantities, at the proper moment and in the required sequence to secure efficient operation of internal combustion engines. For example, U.S. Patent 3,187,733 which issued June 8, 1965 to R. P. Heinz, describes a fuel injection system in which a pump delivers fuel from a tank through a pressure regulating valve to a distributing mechanism and thence to a plurality of differential injection valves. The distributor mechanism is driven by the engine and causes each injection valve to open at the required time during the operating cycle of its associated cylinder.

Other prior fuel injection systems require a positive displacement control of the introduction of fuel into the cylinder. For example, in some systems, timing of injection is governed solely by movement of a fuel pump piston. In still other engines, vacuum tanks have been employed to draw measured quantities of fuel for injection through elaborate fuel distribution valving systems. Aside from considerations of cost and complexity, these prior types of fuel injection systems do not elicit top performance from my engines.

FIGS. 11–14 relate to an injection system particularly suitable for my engine, although it is not essential for proper operation thereof. Briefly, the system employs a fuel pump which delivers fuel under substantially uniform pressure to a fuel distributing manifold which feeds the fuel to the prechamber in each engine cylinder on demand. A separate laminar flow connecting line from the manifold to each prechamber includes a check valve which remains closed except when the fuel pressure exceeds the prechamber pressure. Timing of fuel injection is controlled entirely by operation of the conventional cylinder valves and/or piston during each operating cycle, by the release pressure to which the check valve is set, and by the fuel pressure maintained in the fuel manifold. The amount of fuel fed to each prechamber, as well as the rate of fuel flow, are controlled by varying the fuel pressure in the manifold. Engine speed is controlled by varying the amount of fuel fed into the main combustion chamber of each cylinder. The system eliminates the need for the prior art fuel distributing mechanism and positive timing control devices, and achieves the controlled injection of fuel into the prechambers at the proper times, in the required sequence, and desired amounts.

Figure 11:
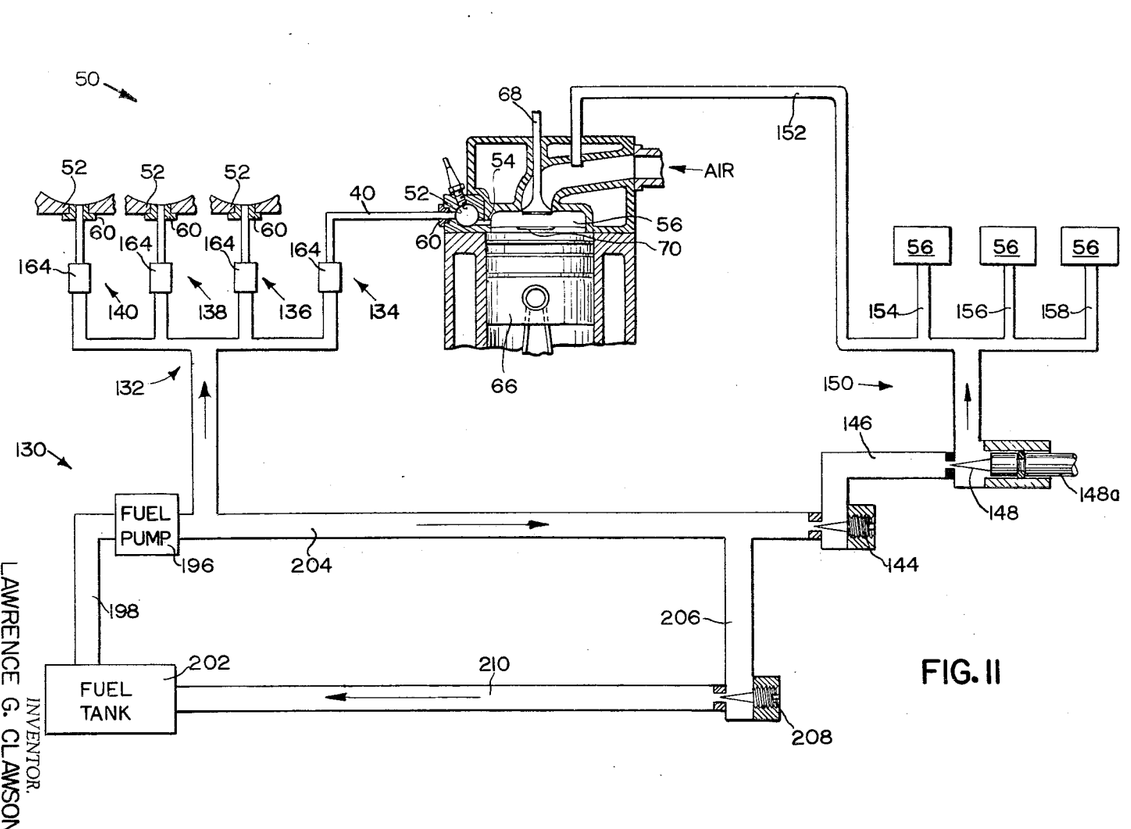
FIG. 11 illustrates an improved fuel injection system for use with an engine made in accordance with this invention.

Referring now to FIG. 11 specifically, an engine 50 has four cylinders, each of which is like the one depicted in FIG. 3 and has parts which are numbered the same as the corresponding parts in FIG. 3. However, it should be understood that the system can also be used with two-cycle engines and rotary piston engines as well as conventional reciprocating engines.

A variable pressure source indicated generally at 130 delivers fuel to a fuel distributing manifold 132. Four special fuel inductors 134, 136, 138 and 140 to be described later lead from manifold 132 to the four prechambers 52.

Source 130 also supplies fuel via an adjustable needle valve 144, a line 146, and a throttle 148, in the form of an adjustable needle valve, to a manifold 150. Manifold 150 has four relatively small diameter branches 152, 154, 156 and 158 leading to the intake ports of the four main chambers 56. Valve 144 serves as a coarse control over fuel flow to the main chambers and throttle 148 provides a fine control thereover. The operator throttles the engine by moving throttle plunger 148a.

Figure 13:
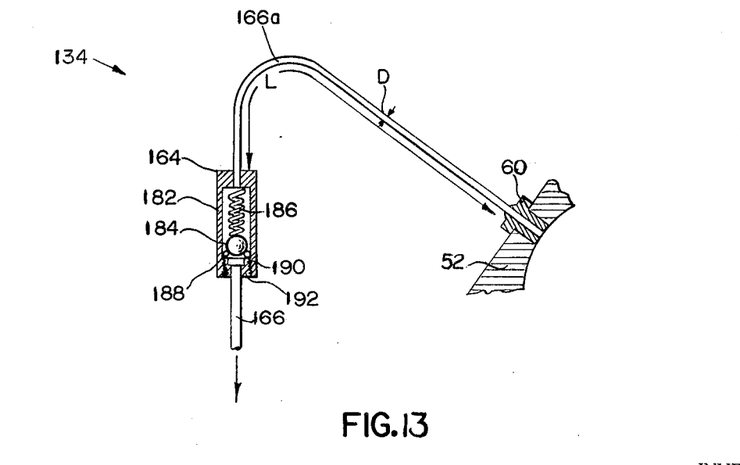
FIG. 13 is an enlarged sectional view, with parts in elevation, of a portion of the FIG. 11 system.

Referring to FIGS. 11 and 13, each inductor 134, 136, 138 and 140 includes a check valve 164. One end of each valve 164 is connected by way of a small diameter fuel line 166 to manifold 132. Its other end is connected via line 166a to the nozzle 60 extending into a prechamber 52.

Each check valve 164 is set to remain closed because of the normal back pressure from the corresponding engine cylinder during the power and compression strokes of the cylinder. However, valves 164 open in response to the pressure drop across them during the scavenging period when the cylinder pressure, specifically the prechamber pressure, falls to a value below that of the fuel pressure. Thus, the timing and sequence of fuel injection into the engine prechambers is controlled primarily by the conventional engine intake and exhaust valves and/or the pistons without requiring any auxiliary fuel distributing valves or additional timing mechanism.

Figure 12:
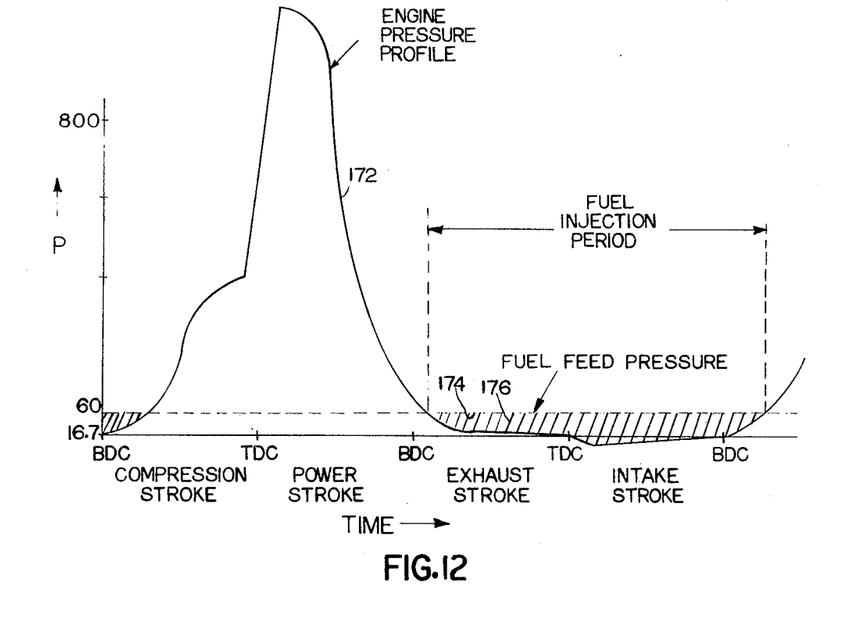
FIG. 12 is a graph illustrating the operation of the FIG. 11 systems.

To illustrate, the curve 172 in FIG. 12 shows a typical pressure (P) profile in one engine 50 cylinder. Assume that the fuel pressure in manifold 132 (FIG. 11) is maintained at a constant pressure of, say, 60 p.s.i., as illustrated by the dotted line 174 in FIG. 12. The pressure in the prechamber 52 typically exceeds the fuel feed pressure (line 174) in manifold 132 from a point shortly after the commencement of the cylinder compression stroke to a point shortly after commencement of the exhaust stroke. During this interval, therefore, valve 164 in the inductor associated with that cylinder is closed and no fuel is fed to prechamber 52.

After commencement of the exhaust stroke, however, the pressure in that cylinder drops below the 60 p.s.i. fuel feed pressure in manifold 132. Thereupon, valve 164 opens and fuel enters the corresponding prechamber 52. Fuel continues to flow into the prechamber during the exhaust and intake portions of the cycle and until shortly after the commencement of the next compression stroke. At this point, the cylinder pressure builds up until it exceeds the fuel feed pressure and closes the valve 164. The total fuel injection is indicated by the length of the hatched area 176 in FIG. 12. The amount of fuel fed to the prechambers, i.e. the duration of the injection period 176, may be controlled by regulating the pressure of the fuel supplied by source 130 to manifold 132. This has the effect of moving line 174 in FIG. 12 up or down relative to curve 172.

Refer now to FIG. 13 which shows in more detail the construction of one inductor, e.g. inductor 134. Preferably, each inductor 134 has nonwetting internal surfaces. Also, the line portion 166a between valve 164 and nozzle 60 has a very small diameter D in relation to its length L. That is, the ratio $D/L$ should be considerably less than 1. For example, in one embodiment of the invention, the ratio $D/L$ is on the order of .0003. This produces a pressure drop between manifold 132 and the cylinder prechamber which is great enough so that small cycle-to-cycle perturbations in the firing cycle will not grossly affect fuel flow. Moreover, the small diameter line portion minimize the standing volume of fuel adjacent the hot engine cylinder and, therefore, minimize the likelihood of fuel caking and clogging in nozzle 60.

For maximum system performance, valve 164 should positively seal. This condition can be satisfied by a good conventional dilating O-ring check valve or the illustrated check valve employing a spring loaded ball. The valve 164 depicted in FIG. 13 comprises a tubular cylindrical housing 182 containing a relatively small diameter hollow ball 184. Ball 184 is biased by a compression spring 186 to seat on an O-ring seal 188 positioned on a reduced diameter shoulder 190 formed by a threaded plug 192 screwed into the inlet end of housing 182. The spring pressure may be varied by screwing the plug 192 toward or away from the outlet end of housing 182 or by other conventional means. Preferably, the spring bias should be such as to start and stop the flow of fuel into the associated cylinder at precisely the proper points in the combustion cycle to obtain the required injection period 176 (FIG. 12). A valve 164 having a ⅜ inch diameter ball 184 biased against a ¼ inch diameter O-ring 188 by a 1½ inch relatively compliant spring 186 produces satisfactory results.

Referring to FIG. 11, fuel source 130 comprises a fuel pump 196 which has its intake 198 connected to a fuel tank 202 and into outlet pressure line 204 connected to manifold 132 and needle valve 144. Line 204 is also connected back to tank 202 by way of a line 206, needle valve 208 and a line 210. Valve 208 controls the return flow of fuel to tank 202 and functions as an engine idling adjustment.

Pump 196 is preferably a constant volume pump geared directly to the engine so that it delivers a substantially constant volume of fuel to the prechambers and main chambers per engine cycle over all engine speeds. Further, fuel lines 146, 198, 204, 206 and 210 and manifold 132 provide large diameter fluid paths between pump 196 and inductors 134, 136, 138 and 140 and between the pump and fuel lines 152, 154, 156 and 158. Also, as noted above, the inductors themselves each have a diameter-to-length ratio which is considerably less than 1, i.e. on the order of .0003. Hence, they may be considered as substantially equivalent to a laminar flow orifice for fluid flow pressure drop considerations. With these constraints, it can be shown that the volume of fuel delivered to both chambers of each cylinder is not a function of engine speed, but rather is substantially constant per engine cycle.

The adjustment of valves 144 and 208 controls the fuel pressure at the inlets of inductors 134, 136, 138 and 140. That is, the closing of valves 144 and 208 reduces the amount of fuel returning to tank 202 and, hence, increases the fuel pressure at the inlet ends of the inductors. Also, the settings of valves 144 and 208 as well as throttle 148 determine the fuel-air ratios in main chambers 56.

Preferably, valve 208 is adjusted so that when throttle 148 is fully closed, sufficient fuel is delivered to each prechamber 20 to run the engine at a suitable idling speed. That is, when the engine idles, no fuel at all is fed to the cylinder main chambers. Rather, the fuel injection period is such that a charge of fuel is fed into each prechamber which is sufficient to idle the engine. Enough air flows into the prechamber from the corresponding main chamber during each intake stroke to form with this prechamber charge, a combustible mixture.

As the operator opens throttle 148, more and more fuel is fed to the engine main chambers 56 during the intake stroke portions of the engine cycle. This fuel mixes with the air which enters when air intake valve 68 opens, forming a combustible mixture in each chamber 56. The main charge in each cylinder is then ignited when the corresponding piston 66 approaches top dead center by the hot gas jet from the corresponding prechamber as fully described above. The ignition of the main chamber charge then results in increased engine output power and speed.

Since pump 196 is geared directly to the engine, it pumps more fuel as engine speed increases to meet the increased demand from the cylinder main chambers. As the engine runs faster, each check valve 164 remains open for a shorter period of time but sees a higher fuel pressure from the pump. Therefore, the total amount of combustible fuel in each prechamber remains substantially constant. This assures relatively smooth engine operation over a relatively wide range of engine speeds.

The setting of valve 144 places an upper limit on the amount of fuel fed to the main chamber and, therefore, controls the maximum speed of the engine.

My injection system also works well with a two-cycle engine. Its operation is much the same as described above except that fuel is injected into each prechamber twice as often as it is in the four-cycle engine in FIG. 11, and the main fuel charge is dribbled directly into the main chamber of each cylinder, the intake and exhaust being controlled by the piston.

Figure 14:
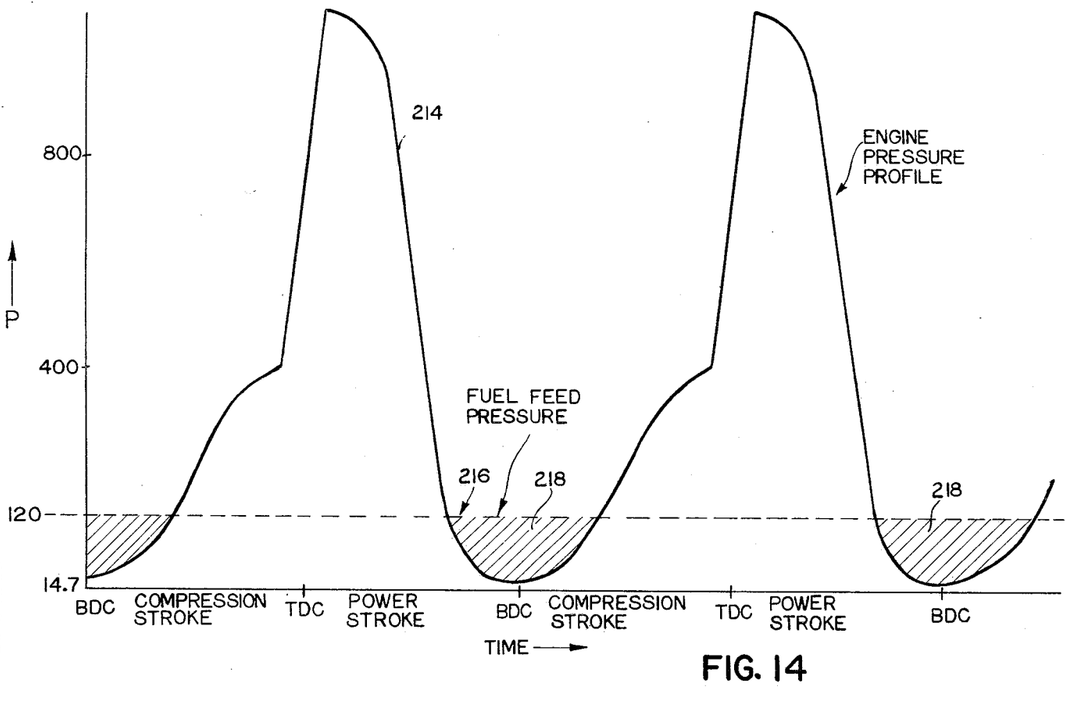
FIG. 14 is a graph similar to FIG. 12 illustrating the operation of the FIG. 11 injection system with a two-cycle engine of my improved type.

The curve 214 in FIG. 14 shows a typical pressure (P) profile in one cylinder of a two-cycle, three-cylinder engine. Assume that the pressure in manifold 132 (FIG. 11) is maintained at, say, 120 p.s.i. as indicated by line 216. FIG. 14 shows that the pressure in the cylinder prechamber falls below the fuel feed pressure (line 216) whenever the piston is near bottom dead center. During each of these periods indicated by the hatched areas 218, a precise change of fuel is introduced into the prechamber. With a zero fuel-air ratio in the corresponding main chamber as described above, the charge is sufficient to operate the engine at a suitable idling speed.

It is also possible to improve further the performance of the two-cycle engine by employing inductors similar to inductor 134 (FIG. 13) to controlledly feed fuel to the engine main chambers. In this event, the inductors are included in the lines between manifold 150 (FIG. 11) and the engine main chambers and they operate much like those associated with the prechambers. During injection period 218, the valves in these inductors open to introduce charges of fuel into the main chambers whose sizes are determined by the throttle setting.

While I have described my injection system with particular reference to preignition engines, in some applications one can also adapt it to a conventional internal conbustion engine as a replacement for the carburetor or other fuel injector to regulate the introduction of fuel into the engine cylinders.

In summary, this invention provides an internal combustion engine of both the reciprocating and rotating piston types in which a small, combustible fuel charge ignited in a prechamber forms a hot jet in the main chamber which is, in essence, an instantaneous ignition source extending substantially the entire length of the main chamber. The jet is hot enough and contacts a sufficiently large portion of the main chamber charge to ignite that charge without relying on flame front propogation. Further, the chambers and their interconnecting passage are so designed that the hot jet from the prechamber travels to the opposite end of the main chamber and ignites any end charge there before the end charge detonates.

The engine is thus characterized by relatively low fuel consumption and high efficiency. Further, it burns clean and, hence, the exhaust has a low level of unburnt fuel and partially oxidized elements. A further feature of the engine is that it operates with a wide variety of hydrocarbon liquid and gaseous fuels essentially without regard to the delay time characteristics or octane ratings.

Further, the performance of my engine is optimized by its associated fuel system which delivers a controlled amount of fuel to each engine cylinder to assure smooth engine operation over a wide range of engine speeds. The system is relatively simple and inexpensive to manufacture and maintain and it can operate my engine reliably for a long period of time on many types of fuel oil from high-octane gasoline to No. 1 diesel oil.

It will thus be seen that the objects set forth above, among those made apparent from the preceding description, are efficiently attained and, since certain changes may be made in carrying out the above method and in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:
1. An internal combustion engine comprising
   (A) a cylinder chamber,
   (B) piston mounted for movement in said cylinder,
   (C) said cylinder having a compressed volume which is elongated along an axis, and
   (D) means for jetting hot gas into said chamber, said hot gas jet being
      (1) directed along said axis, and
      (2) in relatively close proximity to the boundaries of the compressed volume extending generally parallel to said axis so that said hot jet
         (a) penetrates and ignites a fuel-air mixture in said volume regardless of the ability of said mixture to support flame front propagation, and
         (b) penetrates said volume at a sufficient velocity to ignite any end gas therein before the end gas detonates.

2. An internal combustion engine as defined in claim 1 wherein
   (A) said piston reciprocates in said chamber, and
   (B) the ratio of the length of said compressed volume to the square root of the cross sectional area thereof is between 2 and 5.

3. An internal combustion engine as defined in claim 2 wherein the mean height and the mean width of said volume are substantially equal.

4. An internal combustion engine as defined in claim 1 wherein
   (A) said piston rotates in said chamber, and
   (B) the ratio of the length of said compressed volume to the square root of the cross sectional area thereof is between 2 and 8.

5. The method of igniting a fuel-air mixture in the cylinder of an internal combustion engine comprising the steps of
   (A) directing a hot gas jet into the cylinder, and
   (B) confining said mixture to a compressed volume within the cylinder
      (1) which is coextensive with the jet, and
      (2) whose boundries extending generally parallel to the jet remain in relatively close proximity thereto so that the jet
         (a) ignites the mixture within the volume without relying on flame front propagation, and
         (b) penetrates the volume at a velocity sufficient to ignite any end gas in the volume before the end gas detonates due to the buildup of pressure and temperature in the volume.

6. An internal combustion engine of the preignition type having a prechamber, a main chamber and a fluid passage between them, said engine being characterized in that
   (A) the compressed volume of the main chamber is elongated, and
   (B) the axis of said passage is substantially aligned with the long axis of said main chamber so that
      (1) hot gas from said prechamber jets substantially to the far end of said volume, and
      (2) the hot gas jet remains in relatively close proximity to the volume boundaries extending generally parallel to the gas jet whereby the jet
         (a) ignites said mixture regardless of its ability to support flame front propagation, and
         (b) penetrates said volume at a sufficient velocity to ignite any end charge in said volume before the end charge detonates due to the buildup of pressure and temperature in said volume.

7. An internal combustion engine as defined in claim 6 wherein the square root of the cross sectional area of the minimum aperture of said passage is between approximately 0.13 and 0.24 times the cube root of the volume of said prechamber.

8. An internal combustion engine as defined in claim 7 wherein the means height and the mean width of said aperture are substantially equal.

9. An internal combustion engine as defined in claim 6 wherein
  (A) said engine has a reciprocating piston, and
  (B) the ratio of the length of said compressed volume to the square root of the cross sectional area thereof is between 2 and 5.

10. An internal combustion engine as defined in claim 6 wherein the volume of said prechamber is on the order of one-twelfth to one-eighth of the total compressed volume of both said chambers so that the fuel charge in the prechamber is sufficient to operate the engine with a zero fuel-air ratio in said main chamber.

11. An internal combustion engine as defined in claim 10 wherein said prechamber volume is approximately one-tenth of said total compressed volume.

12. An internal combustion engine as defined in claim 6 and further including ignition means arranged to ignite a combustible fuel-air charge in said prechamber.

13. An internal combustion engine as defined in claim 6 wherein
  (A) said engine has a rotating piston, and
  (B) the ratio of the length of said compressed volume to the square root of the cross sectional area thereof is between 2 and 8.

14. A multi-cylinder internal combustion engine of the preignition reciprocating piston type having for each cylinder a main chamber, a prechamber and a passage between them, said engine being characterized in that
  (A) the compressed volume of the main chamber is elongated so that the ratio of its mean length to the square root of its cross sectional area is between 2 and 5.
  (B) the axis of said passage is substantially aligned with the long axis of said volume,
  (C) the square root of the cross sectional area of the minimum aperture of said passage is between approximately 0.13 and 0.24 times the cube root of the volume of said prechamber, and
  (D) the volume of said prechamber is on the order of one-twelfth to one-eighth of the total compressed volume of both said chambers.

15. An internal combustion engine of the preignition type in which each cylinder thereof has a main chamber, a prechamber, a fluid passage between them and an associated fuel source, said engine being characterized in that
  (A) each said fuel source comprises
    (1) a fuel line for conducting fuel under pressure to said prechamber, and
    (2) a check valve in each said fuel line, said valve
      (a) arranged to remain closed under back pressure from the associated engine cylinder during the compression and power strokes thereof, and
      (b) set to open during the scavenging periods of the associated cylinder when the cylinder pressure is less than the fuel line pressure,
  (B) the compressed volume of said main chamber is elongated, and
  (C) the axis of said passage is substantially aligned with the long axis of said main chamber so that
    (1) hot gas generated in said prechamber jets substantially to the far end of said volume, and
    (2) the hot gas jet remains in relatively close proximity to the volume boundaries extending generally parallel to the gas jet so that the jet
      (a) ignites said mixture regardless of its ability to support flame front propagation, and
      (b) penetrates said volume at a sufficient velocity to ignite any end charge in said volume before the end charge detonates.

16. An internal combustion engine as defined in claim 15 wherein the square root of the cross sectional area of the minimum aperture of said passage is between approximately 0.13 and 0.24 times the cube root of the volume of said prechamber.

17. An internal combustion engine as defined in claim 16 wherein said prechamber volume is approximately one-twelfth to one-eighth of the total compressed volume of both said chambers.

18. An internal combustion engine as defined in claim 16 wherein
  (A) each cylinder has a reciprocating piston, and
  (B) the ratio of the length of said compressed volume to the square root of the cross sectional area thereof is between 2 and 5.

19. An internal combustion engine as defined in claim 15 and further including means for adjusting the fuel pressure in each said fuel line so as to adjust the flow of fuel to each said prechamber.

20. An internal combustion engine as defined in claim 19 and further including
  (A) additional fuel lines communicating between said source and each of said main chambers, and
  (B) means for varying the flow of fuel through said additional lines to said main chambers so as to vary the speed of the engine.

21. An internal combustion engine as defined in claim 20 wherein each of said additional lines contains a said check valve.

References Cited

UNITED STATES PATENTS

| | | |
|---|---|---|
| 2,758,576 | 8/1956 | Schlamann. |
| 2,803,230 | 8/1957 | Bensinger. |
| 3,053,238 | 9/1962 | Meurer. |
| 3,063,434 | 11/1962 | Haas. |
| 3,154,058 | 10/1962 | Warren. |

FOREIGN PATENTS

| | | |
|---|---|---|
| 947,284 | 1/1964 | Great Britain. |
| 995,101 | 6/1965 | Great Britain. |

OTHER REFERENCES

SAE Journal, November 1963, pp. 60, 61, 62, 63, 64.

WENDELL E. BURNS, Primary Examiner

U.S. Cl. X.R.

123—8, 32, 75, 140